US012500354B2

(12) United States Patent
Halbauer et al.

(10) Patent No.: US 12,500,354 B2
(45) Date of Patent: Dec. 16, 2025

(54) APPARATUS FOR PROCESSING RADIO FREQUENCY SIGNALS, NETWORK ELEMENT FOR A WIRELESS COMMUNICATIONS SYSTEM, AND USER EQUIPMENT FOR A WIRELESS COMMUNICATIONS SYSTEM

(71) Applicant: NOKIA SOLUTIONS AND NETWORKS OY, Espoo (FI)

(72) Inventors: Hardy Halbauer, Ettlingen (DE); Silvio Mandelli, Tamm (DE); Stephan Saur, Stuttgart (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 386 days.

(21) Appl. No.: 18/000,336

(22) PCT Filed: May 27, 2021

(86) PCT No.: PCT/FI2021/050386
§ 371 (c)(1),
(2) Date: Nov. 30, 2022

(87) PCT Pub. No.: WO2021/245329
PCT Pub. Date: Dec. 9, 2021

(65) Prior Publication Data

US 2023/0246348 A1 Aug. 3, 2023

(30) Foreign Application Priority Data

Jun. 1, 2020 (FI) .................................... 20205571

(51) Int. Cl.
*H01Q 3/00* (2006.01)
*H01Q 3/24* (2006.01)
(Continued)

(52) U.S. Cl.
CPC ............... *H01Q 21/28* (2013.01); *H01Q 3/24* (2013.01); *H01Q 3/34* (2013.01); *H01Q 21/065* (2013.01)

(58) Field of Classification Search
CPC ............ H01Q 21/28; H01Q 3/24; H01Q 3/34; H01Q 21/065; H01Q 25/00; H04B 1/005
See application file for complete search history.

(56) References Cited

U.S. PATENT DOCUMENTS

2007/0030208 A1* 2/2007 Linehan ................ H01Q 21/28
343/757
2017/0346182 A1* 11/2017 Martikkala ........... H01Q 3/267
(Continued)

FOREIGN PATENT DOCUMENTS

EP 2 916 385 A1 9/2015
WO WO 2016/007138 A1 1/2016

OTHER PUBLICATIONS

International Search Report and Written Opinion for Patent Cooperation Treaty Application No. PCT/FI2021/050386 dated Sep. 10, 2021, 17 pages.
(Continued)

*Primary Examiner* — Ping Y Hsieh
(74) *Attorney, Agent, or Firm* — ALSTON & BIRD LLP

(57) ABSTRACT

An apparatus (100) for processing radio frequency signals, comprising a first antenna system (110) having a controllable first antenna characteristic and a second antenna system (120) having a controllable second antenna characteristic, wherein the first antenna system is configured to operate in a first frequency range, wherein the second antenna system is configured to operate in a second frequency range which is different from the first frequency range.

20 Claims, 6 Drawing Sheets

(51) Int. Cl.

| | |
|---|---|
| ***H01Q 3/34*** | (2006.01) |
| ***H01Q 21/06*** | (2006.01) |
| ***H01Q 21/28*** | (2006.01) |

(56) References Cited

U.S. PATENT DOCUMENTS

| | | | | |
|---|---|---|---|---|
| 2019/0020121 | A1* | 1/2019 | Paulotto | H01Q 21/28 |
| 2019/0036231 | A1 | 1/2019 | Ryu et al. | |
| 2019/0239092 | A1 | 8/2019 | Zhou et al. | |
| 2019/0246394 | A1* | 8/2019 | Asplund | H04L 25/0202 |

OTHER PUBLICATIONS

Office Action for Finland Application No. 20205571 dated Oct. 1, 2020, 10 pages.

Office Action for Finland Application No. 20205571 dated Sep. 14, 2021, 1 page.

* cited by examiner

APPARATUS FOR PROCESSING RADIO FREQUENCY SIGNALS, NETWORK ELEMENT FOR A WIRELESS COMMUNICATIONS SYSTEM, AND USER EQUIPMENT FOR A WIRELESS COMMUNICATIONS SYSTEM

CROSS-REFERENCE TO RELATED APPLICATIONS

This application is a national phase entry of International Application No. PCT/FI2021/050386, filed May 27, 2021, which claims priority to Finnish Application No. 20205571, filed Jun. 1, 2020, the contents of which are hereby incorporated by reference in their entirety.

FIELD OF THE DISCLOSURE

The disclosure relates to an apparatus for processing radio frequency, RF, signals.

The disclosure also relates to a network element for a wireless communications system.

The disclosure also relates to a user equipment for a wireless communications system.

BACKGROUND

RF signals may for example be used to wirelessly exchange data between different entities such as different elements of a wireless communications system, for example a network element or base station, and one or more user equipment.

SUMMARY

The scope of protection sought for various embodiments of the disclosure is set out by the independent claims. The exemplary embodiments and features, if any, described in this specification, that do not fall under the scope of the independent claims, are to be interpreted as examples useful for understanding various exemplary embodiments of the disclosure.

Some embodiments relate to an apparatus for processing radio frequency signals, comprising a first antenna system having a controllable first antenna characteristic and a second antenna system having a controllable second antenna characteristic, wherein the first antenna system is configured to operate in a first frequency range, wherein the second antenna system is configured to operate in a second frequency range which is different from the first frequency range. This enables to selectively use the first or second antenna system or, according to some embodiments, both the first and second antenna system, for example simultaneously.

According to some embodiments, the controllable first antenna characteristic and/or the controllable second antenna characteristic enables to form antenna beams with the respective antenna system. According to some embodiments, such beams may for example be used for directed wireless communications between the apparatus and at least one further device.

According to some embodiments, inter alia depending on the respective frequency, the beams may comprise different shape, which may for example be expressed by a half-power bandwidth parameter.

According to some embodiments, the apparatus comprises a carrier, wherein the first antenna system and the second antenna system is arranged on the carrier.

According to some embodiments, the carrier may be a mechanical carrier configured to carry, for example mechanically support, the first antenna system and the second antenna system.

According to some embodiments, the carrier may for example comprise a surface on which the first antenna system and the second antenna system may be arranged.

According to some embodiments, the carrier may for example comprise a planar surface on which the first antenna system and the second antenna system are arranged.

According to some embodiments, at least one of the first antenna system and the second antenna system comprises at least one of: a) antenna array, that is a plurality of individual antenna elements, b) a plurality of patches, for example planar antenna elements or sub-sets of co-located planar antenna elements.

According to some embodiments, the second antenna system may be a high gain antenna array configured to provide antenna beams with a comparatively large gain.

According to some embodiments, the first antenna system may be configured to provide antenna beams with a comparatively small gain, that is smaller than the gain of the high gain antenna according to some embodiments.

According to some embodiments, the first frequency range comprises frequencies less than or equal to 6 GHz, for example between 450 MHz and 6 GHz.

According to some embodiments, the second frequency range comprises frequencies greater than 6 GHz.

According to some embodiments, the second frequency range comprises frequencies greater than 24 GHz.

According to some embodiments, the second frequency range comprises frequencies greater than 52.6 GHz.

According to some embodiments, the second frequency range comprises frequencies greater than 100 GHz.

According to some embodiments, the first antenna system comprises a plurality of antenna elements, wherein at least one of the plurality of antenna elements is arranged in a radially outer region of the carrier.

According to some embodiments, the second antenna system comprises at least a first antenna element, wherein the first antenna element of the second antenna system is arranged in a radially inner region of the carrier.

According to some embodiments, the second antenna system comprises at least a first antenna element and a second antenna element, wherein the second antenna element of the second antenna system is arranged in a radially outer region of the carrier.

Some embodiments relate to a network element, for example for a wireless communications system, comprising at least one apparatus according to the embodiments.

According to some embodiments, the network element may be a base station for a wireless communications system, for example a gNB.

According to some embodiments, the network element is configured to perform a first beam search using the first antenna system to determine an estimate value of an angle of arrival (AoA) and/or angle of departure (AoD) of radio frequency signals. According to some embodiments, this may for example be used for determining a direction of a user equipment, UE, or of a cluster of user equipment relative to the network element.

According to some embodiments, the network element is configured to perform a second beam search using the second antenna system based on the estimate value of the angle of arrival. This enables to obtain refined results for the estimate value of the AoA.

According to some embodiments, the network element is configured to set a boresight direction of the apparatus based on the estimate value.

According to some embodiments, at least one actuator such as for example a motor may be used to set the boresight direction.

According to some embodiments, other types of actuators may be used to set the boresight direction.

According to some embodiments, the boresight direction may be aligned with the AoA associated with RF signals of a UE or cluster of UE. According to some embodiments, after aligning the boresight direction, the network element may wirelessly exchange information with the UE or cluster of UE using the first antenna system and/or the second antenna system.

According to some embodiments, the network element is configured to send pilot signals using the first antenna system, and to receive at least one of the following elements from at least one user equipment: a) first information characterizing an angle of departure, AoD, of the pilot signals at the network element, b) a second information characterizing a phase difference between the pilot signals as determined by the UE.

According to some embodiments, the network element is configured to align a boresight direction of the at least one apparatus based on at least one of the first information and the second information.

According to some embodiments, the network element may comprise at least two apparatus according to the embodiments, that is a first apparatus according to the embodiments and a second apparatus according to the embodiments, wherein the network element is configured to align a first boresight direction of the first apparatus and a second boresight direction of the second apparatus, wherein the second boresight direction of the second apparatus may be different from the first boresight direction of the first apparatus.

Some embodiments relate to a user equipment, for example for a wireless communications system, comprising at least one apparatus according to the embodiments.

Some embodiments relate to a method of operating an apparatus for processing radio frequency signals, comprising a first antenna system having a controllable first antenna characteristic and a second antenna system having a controllable second antenna characteristic, wherein the first antenna system operates in a first frequency range, wherein the second antenna system operates in a second frequency range which is different from the first frequency range.

Some embodiments relate to a method of operating a network element for a wireless communications system, comprising at least one apparatus according to the embodiments, wherein the network element may be a base station for a wireless communications system, for example a gNB, wherein the network element performs a first beam search using the first antenna system to determine an estimate value of an angle of arrival of radio frequency signals.

BRIEF DESCRIPTION OF THE FIGURES

Some exemplary embodiments will now be described with reference to the accompanying drawings in which.

DESCRIPTION OF SOME EMBODIMENTS

Figure 1:
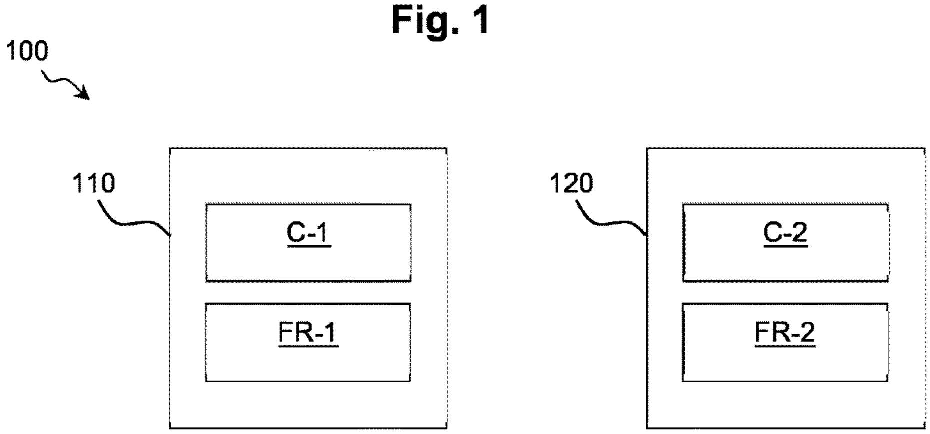
FIG. 1 schematically depicts a simplified block diagram of an apparatus according to some embodiments, FIG. 2 schematically depicts a simplified block diagram of an apparatus according to some embodiments, FIG. 3 schematically depicts a simplified top view of an apparatus according to some embodiments, FIG. 4 schematically depicts a simplified top view of an apparatus according to some embodiments, FIG. 5 schematically depicts beam patterns according to some embodiments, FIG. 6 schematically depicts beam patterns according to some embodiments, FIG. 7 schematically depicts a simplified block diagram of a network element according to some embodiments, FIG. 8 schematically depicts a simplified block diagram of a user equipment according to some embodiments, FIG. 9 schematically depicts a simplified flow chart of a method according to some embodiments, FIG. 10 schematically depicts a simplified flow chart of a method according to some embodiments, FIG. 11 schematically depicts a simplified block diagram of a scenario according to some embodiments, FIG. 12 schematically depicts a simplified flow chart of a method according to some embodiments, FIG. 13 schematically depicts a simplified flow chart of a method according to some embodiments, and FIG. 14, 15 each schematically depicts a simplified block diagram of a scenario according to some embodiments.

Some embodiments relate to an apparatus 100, FIG. 1, for processing (for example, transmitting and/or receiving) radio frequency signals. The apparatus 100 comprises a first antenna system 110 having a controllable first antenna characteristic C-1 and a second antenna system 120 having a controllable second antenna characteristic C-2, wherein the first antenna system 110 is configured to operate in a first frequency range FR-1, wherein the second antenna system 120 is configured to operate in a second frequency range FR-2 which is different from the first frequency range FR-1. This enables to selectively use the first or second antenna system or, according to some embodiments, both the first and second antenna system 110, 120, for example simultaneously. According to some embodiments, the antenna system 110, 120 to be used may be determined based on an operational state for example of a target system for the apparatus 100, for example a base station or a user equipment for a wireless communications network.

In some embodiments, the apparatus 100 according to the embodiments may be used for or within wireless communications systems based on or at least partially adhering to, and not limited to, third generation partnership project, 3GPP, radio standards such as 4G E-UTRAN or 5G NR (fifth generation new radio).

According to some embodiments, the controllable first antenna characteristic C-1 and/or the controllable second antenna characteristic C-2 enables to form antenna beams with the respective antenna system 110, 120. According to some embodiments, such beams may for example be used for directed wireless communications between the apparatus and at least one further device.

According to some embodiments, a beam or antenna beam is defined as a far field radiated beam of radio frequency or electromagnetic energy which has an antenna directivity and directional gain.

Figure 5:
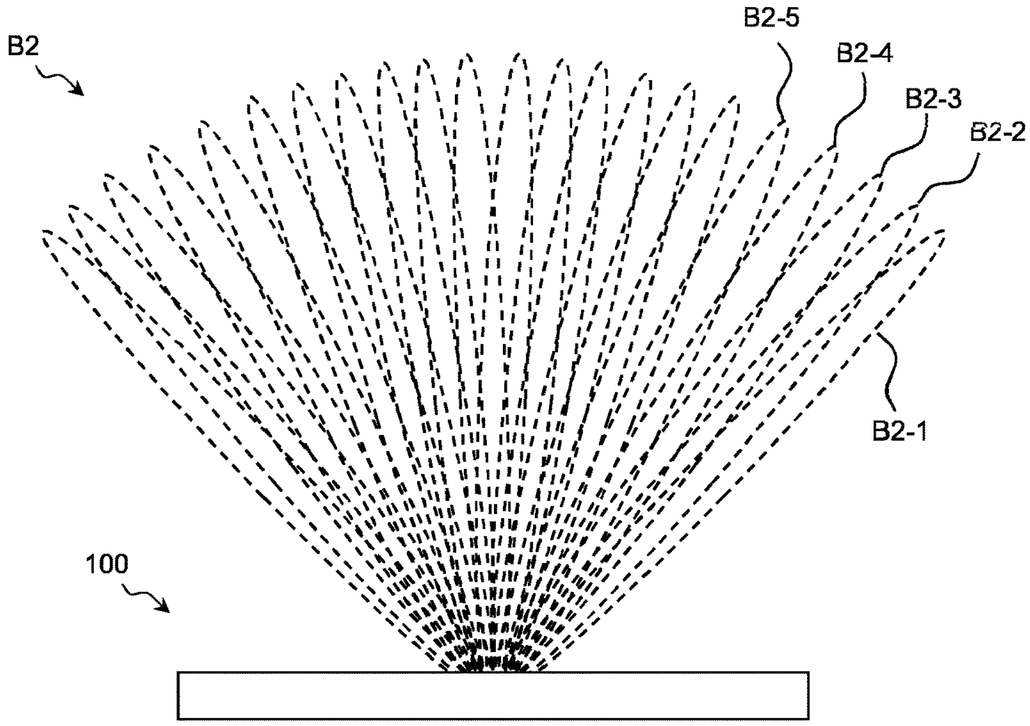

As an example, FIG. 5 exemplarily depicts a beam pattern B2 comprising a plurality of comparatively narrow antenna beams as may be attained by using the second antenna system 120 according to some embodiments. For the sake of clarity, only five individual beams are denoted with reference signs B2-1, B2-2, B2-3, B2-4, B2-5 in FIG. 5.

Figure 6:
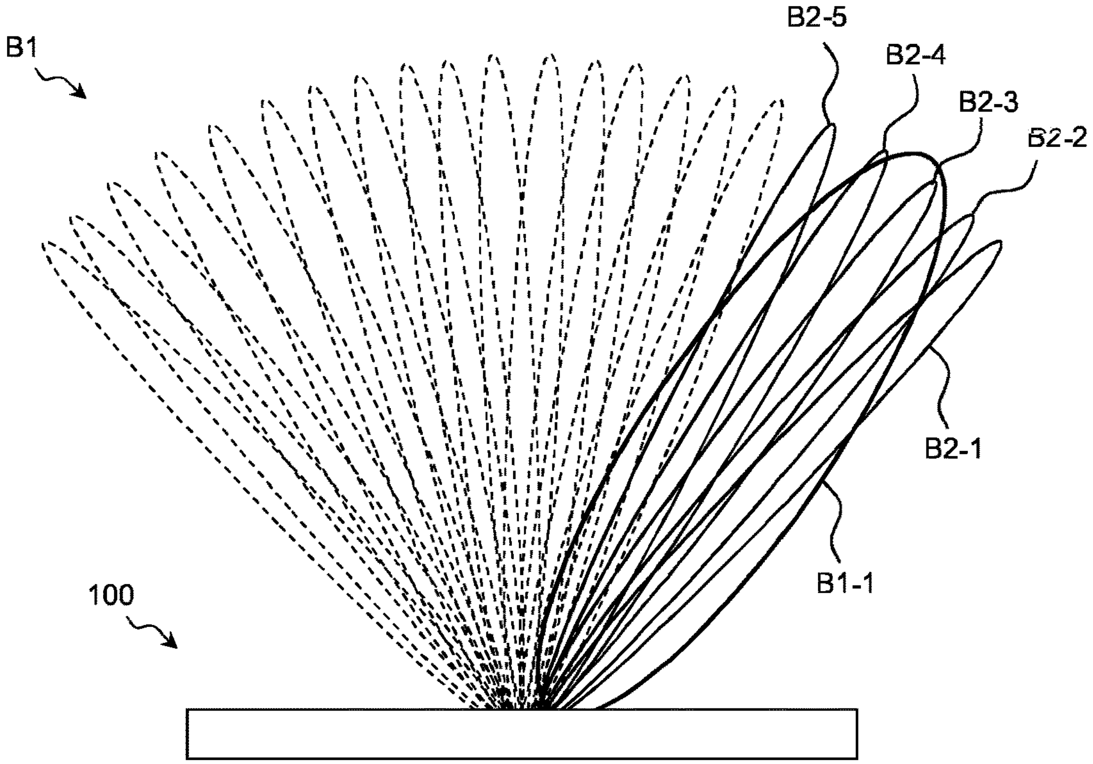

FIG. 6 exemplarily depicts a beam pattern B1, which also comprises the "narrow" beams of FIG. 5, but which also comprises a further beam B1-1 as may for example be attained by using the first antenna system 110 (FIG. 1) according to some embodiments. As can be seen, according to some embodiments, the beam B1-1 covers an angular range similar to that covered by the five narrow beams B2-1, . . . , B2-5.

According to some embodiments, beams of the type B1-1 (FIG. 6) may for example be used for an efficient "coarse" beam search or the like, for example sweeping a predetermined angular range, whereas beams of the type B2-1, B2-2, . . . may be used for refining an angular positioning of the beam characteristic as obtained by apparatus 100.

While FIG. 5, 6 exemplarily depict the beam patterns B1, B2 in one plane corresponding with the drawing plane, according to some embodiments, similar observations apply to the beam patterns in at least one other dimension, that is a plane orthogonal to the drawing plane of FIG. 5, 6.

According to some embodiments, inter alia depending on the respective frequency, the beams may comprise different shape, cf. FIG. 5, 6, which may for example be expressed by a half-power bandwidth parameter.

Figure 2:
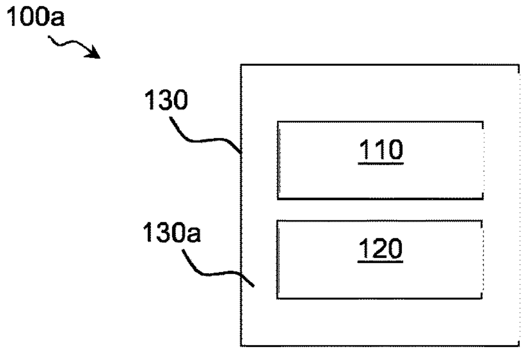

According to some embodiments, the apparatus 100, cf. FIG. 2, comprises a carrier 130, wherein the first antenna system 110 and the second antenna system 120 is arranged on the carrier 130.

According to some embodiments, the carrier 130 may for example comprise a surface 130*a* on which the first antenna system 110 and the second antenna system 120 may be arranged.

According to some embodiments, the first antenna system 110 may be arranged on a first surface of the carrier 130 such as for example the surface 130*a*, and the second antenna system 120 may be arranged on a second surface (not shown) of the carrier 130 which is different from the first surface 130*a*.

According to some embodiments, the first antenna system 110 may be arranged on a first carrier 130, and the second antenna system 120 may be arranged on a second carrier (not shown) which is different from the first carrier 130.

According to some embodiments, the first antenna system 110 and the second antenna system 120 may be arranged in a same plane, as is for example the case when the both antenna systems 110, 120 are arranged on the surface 130*a*, wherein the surface 130*a* is a planar surface.

Figure 3:
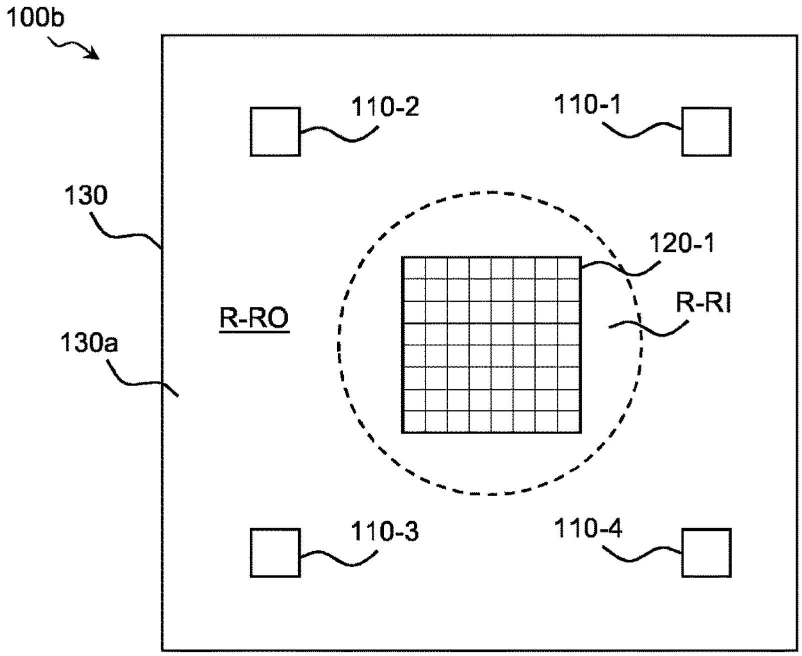
Figure 4:
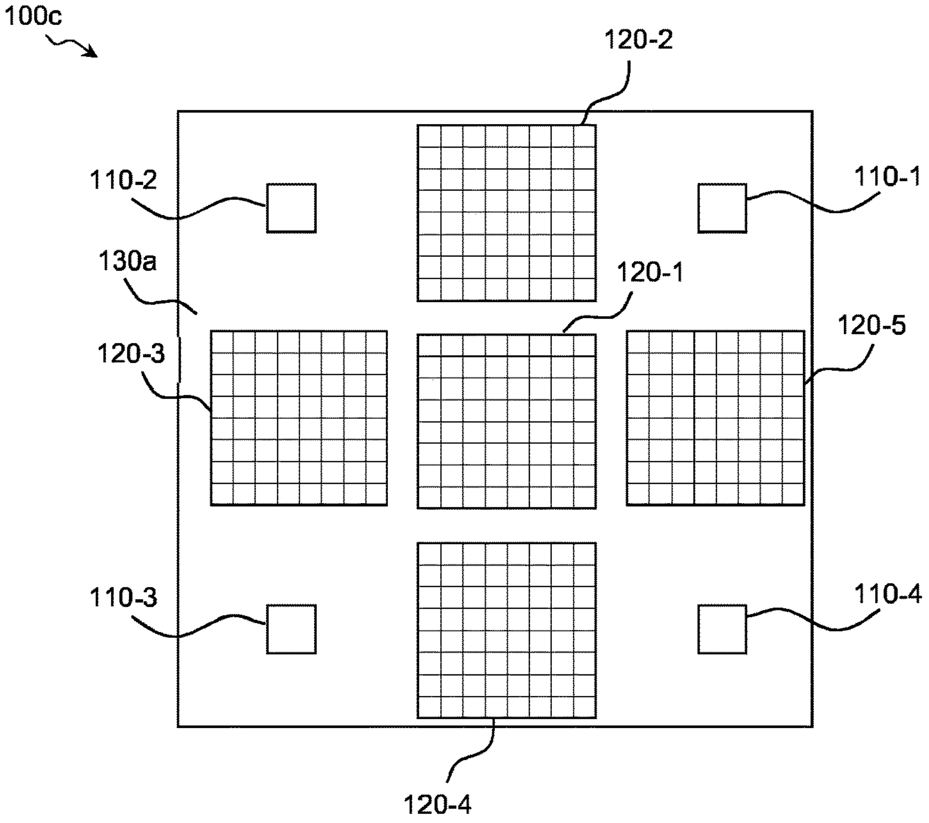

According to some embodiments, at least one of the first antenna system 110 and the second antenna system 120 comprises at least one of: a) antenna array, that is a plurality of individual antenna elements, for example in the form of a phased array 110-1, . . . , 110-4 (FIG. 3), b) a plurality of patches, for example planar antenna elements, for example sub-sets of co-located planar antenna elements 120-1 (FIG. 3), 120-1, . . . , 120-5 (FIG. 4).

According to some embodiments, the second antenna system 120 may be a high gain antenna array configured to provide antenna beams B2-1, B2-2, . . . (FIG. 5) with a comparatively high gain, compared to, for example, an omnidirectional dipole radiation pattern or an isotropic radiation pattern.

According to some embodiments, the first antenna system 110 may be configured to provide antenna beams B2-1 (FIG. 6) with a comparatively small gain, that is smaller than the gain of the high gain antenna array according to some embodiments.

According to some embodiments, the first frequency range FR-1 (FIG. 1) comprises frequencies less than or equal to 6 GHz, for example between 450 MHz and 6 GHz, that is corresponding a frequency range FR1 as defined by 5G NR.

According to some embodiments, the second frequency range FR-2 comprises frequencies greater than 6 GHz.

According to some embodiments, the second frequency range FR-2 comprises frequencies greater than 24 GHz.

According to some embodiments, the second frequency range FR-2 comprises frequencies greater than 52.6 GHz.

According to some embodiments, the second frequency range FR-2 comprises frequencies greater than 100 GHz.

According to some exemplary embodiments 100*b*, FIG. 3, the first antenna system comprises a plurality of antenna elements 110-1, 110-2, 110-3, 110-4, wherein at least one of the plurality of antenna elements 110-1, 110-2, 110-3, 110-4, is arranged in a radially outer region R-RO of the carrier 130.

According to some exemplary embodiments, the second antenna system comprises at least a first antenna element 120-1, wherein the first antenna element 120-1 of the second antenna system 120 is arranged in a radially inner region R-RI of the carrier 130. That is, according to some embodiments, the first antenna element 120-1 of the second antenna system 120 may be radially surrounded by the antenna elements 110-1, 110-2, 110-3, 110-4 of the first antenna system.

According to some exemplary embodiments 100*c*, cf. FIG. 4, the second antenna system 120 comprises at least a first antenna element 120-1 and a second antenna element 120-2 (presently for example five antenna elements 120-1, 120-2, 120-3, 120-4, 120-5), wherein the second antenna element 120-2 of the second antenna system 120 is arranged in a radially outer region R-RO (see for example FIG. 3) of the carrier 130.

According to some embodiments, the apparatus 100, 100*a*, 100*b*, 100*c* may for example be used for beam selection as for example provided by 3GPP NR Rel. 15, wherein an increased flexibility is offered in that the different antenna systems 110, 120 with their different beam shapes may for example selectively be used.

Figure 7:
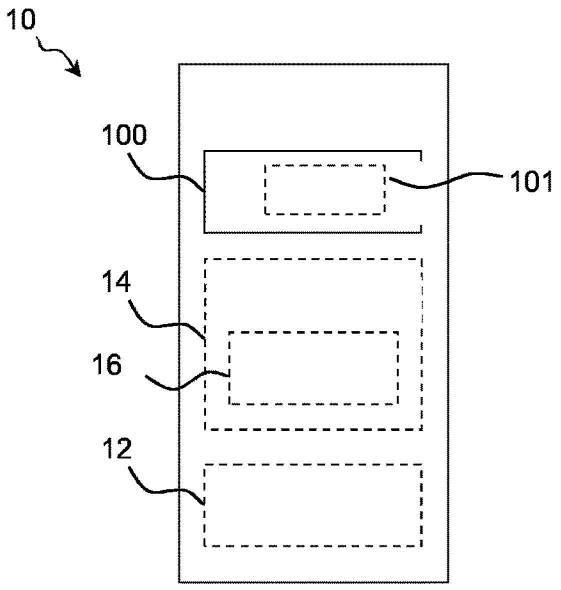

Some embodiments, cf. FIG. 7, relate to a network element 10 for a wireless communications system, comprising at least one apparatus 100 according to the embodiments.

According to some embodiments, the network element 10 may be a base station for a wireless communications system, for example a gNB.

According to some embodiments, the network element 10 may comprise at least one processor 12, and memory 14 storing instructions 16 that, when executed by the at least one processor 12, control an operation of the network element 10, for example using the apparatus 100, for example to perform a process of beam search and/or beam selection.

Figure 9:
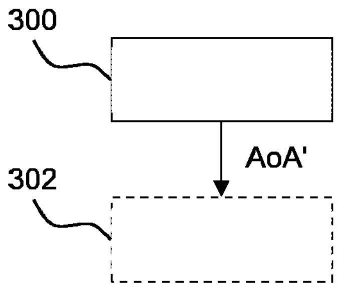

According to some embodiments, cf. FIG. 9, the network element 10 is configured to perform a first beam search 300 using the first antenna system 110 (FIG. 1) to determine an estimate value AoA' of an angle of arrival (AoA) of radio frequency signals, which may for example be received from one or more user equipment (not shown). According to some embodiments, this may for example be used for determining a direction of the user equipment or of a cluster of user equipments relative to the network element 10.

According to some embodiments, cf. FIG. 9, the network element 10 is configured to perform a second beam search 302 using the second antenna system 120 based on the estimate value AoA' of the angle of arrival. This enables to obtain refined results for the estimate value AoA' of the AoA.

According to some embodiments, an estimation of the rough arrival angle using the first antenna system 110 according to some embodiments allows to reduce the search space for a final (that is, more precise) beam search and alignment procedure that, according to some embodiments, may be run as a second block at the higher carrier frequencies, e.g. using the second antenna system 120, with more narrow and high-gain beams B2-1, B2-2, . . . , e.g. to determine the proper beam for transmission.

Figure 10:
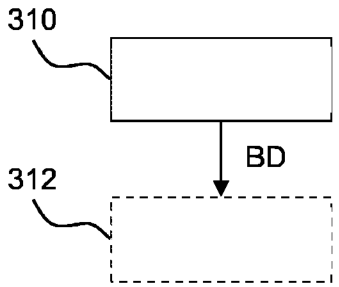

According to some embodiments, cf. FIG. 10, the network element 10 is configured to set 310 a boresight direction BD of the apparatus 100 based on the estimate value AoA'.

According to some embodiments, at least one actuator 101 (FIG. 7) such as for example a motor may be used to set 310 the boresight direction BD. According to some embodiments, two actuators may be provided enabling to drive movement of the apparatus 100 in two dimensions. According to some embodiments, after setting the boresight direction BD, the network element 10 may exchange data with one or more UE, cf. the optional block 312 of FIG. 10.

Figure 11:
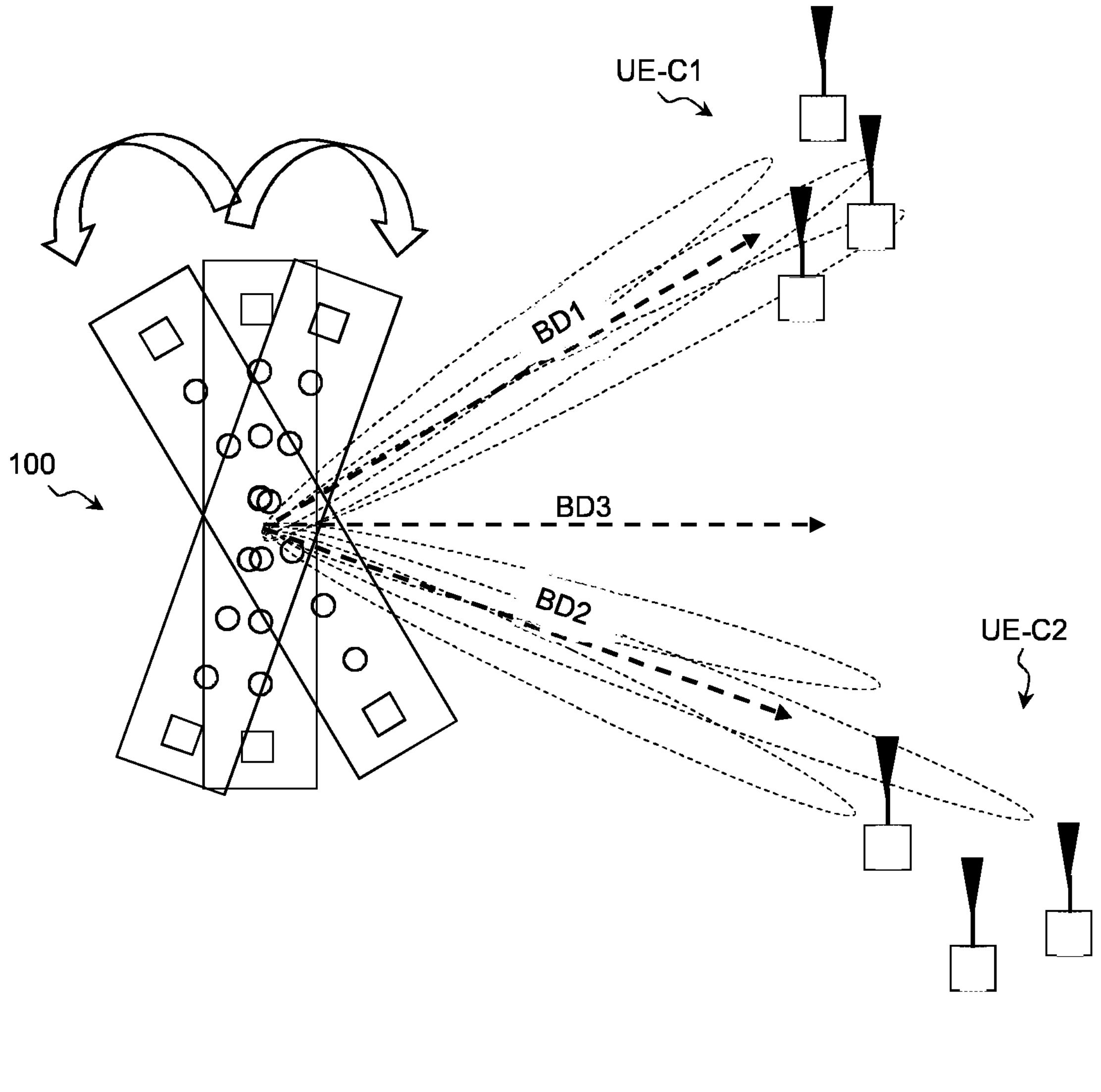

FIG. 11 schematically depicts a scenario according to some embodiments, where the apparatus 100 is depicted in three different (for example rotational or angular) states being characterized by a different boresight direction BD1, BD2, BD3 each.

According to some embodiments, the boresight direction BD1, BD2, BD3 may be aligned with the AoA associated with RF signals of a UE or cluster UE-C1, UE-C2 of UE. According to some embodiments, after aligning the boresight direction, the network element 10 (FIG. 7) may wirelessly exchange information with the UE or cluster of UE using the first antenna system 110 and/or the second antenna system 120, cf. block 312 of FIG. 10.

Figure 12:
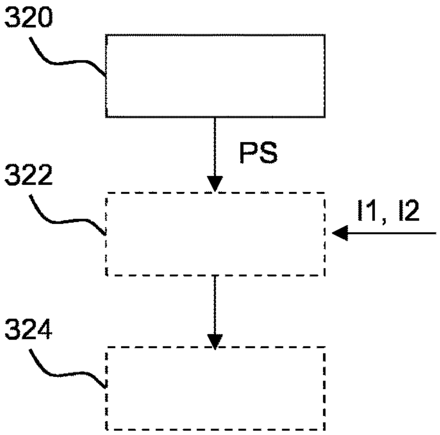

According to some embodiments, cf. FIG. 12, the network element 10 (FIG. 7) is configured to send 320 pilot signals PS using the first antenna system 110 (FIG. 1), and optionally to receive 322 at least one of the following elements from at least one user equipment: a) first information I1 characterizing an angle of departure, AoD, of the pilot signals PS at the network element 10, b) a second information I2 characterizing a phase difference between the pilot signals PS as determined by the UE.

According to some embodiments, the network element 10 is configured to optionally align 324 a boresight direction BD of the at least one apparatus 100 based on at least one of the first information I1 and the second information I2.

Figure 8:
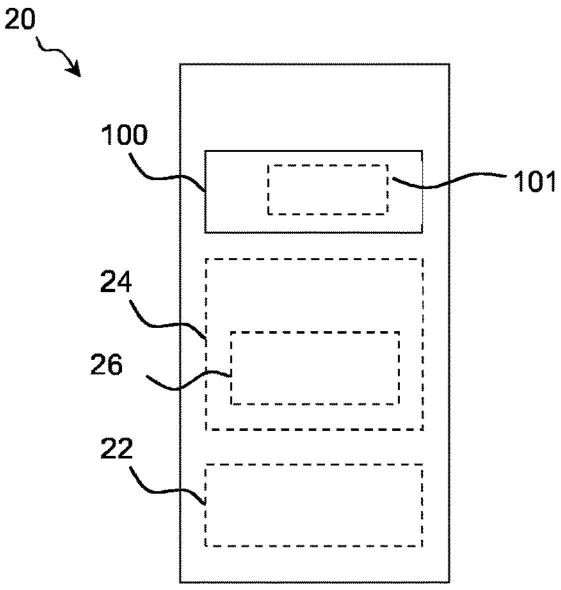

Some embodiments, cf. FIG. 8, relate to a user equipment 20 for a wireless communications system, comprising at least one apparatus 100 according to the embodiments.

According to some embodiments, the UE 20 may comprise at least one processor 22, and memory 24 storing instructions 26 that, when executed by the at least one processor 22, control an operation of the UE 20, for example using the apparatus 100, for example to perform a process of beam search and/or beam selection.

Some embodiments relate to a method of operating an apparatus 100 (FIG. 1) for processing radio frequency signals, comprising a first antenna system 110 having a controllable first antenna characteristic C-1 and a second antenna system 120 having a controllable second antenna characteristic C-2, wherein the first antenna system 110 operates in a first frequency range FR-1, wherein the second antenna system 120 operates in a second frequency range FR-2 which is different from the first frequency range FR-1.

Some embodiments relate to a method of operating a network element 10 for a wireless communications system, or generally a transmission reception point, comprising at least one apparatus 100 according to the embodiments, wherein the network element 10 may be a base station for a wireless communications system, for example a gNB, wherein the network element 10 performs 300 a first beam search using the first antenna system 110 to determine an estimate value of an angle of arrival of radio frequency signals.

Some embodiments relate to a method of operating a UE 20 for a wireless communications system, comprising at least one apparatus 100 according to the embodiments, wherein the UE 20 selectively uses the first antenna system 110 and/or the second antenna system 120.

According to some embodiments, the principle according to the embodiments may also be used in a device for vehicle communication, for example vehicle-to-vehicle communication, or in Internet-of-Things devices, for example for locating other devices and/or users thereof.

Figure 13:
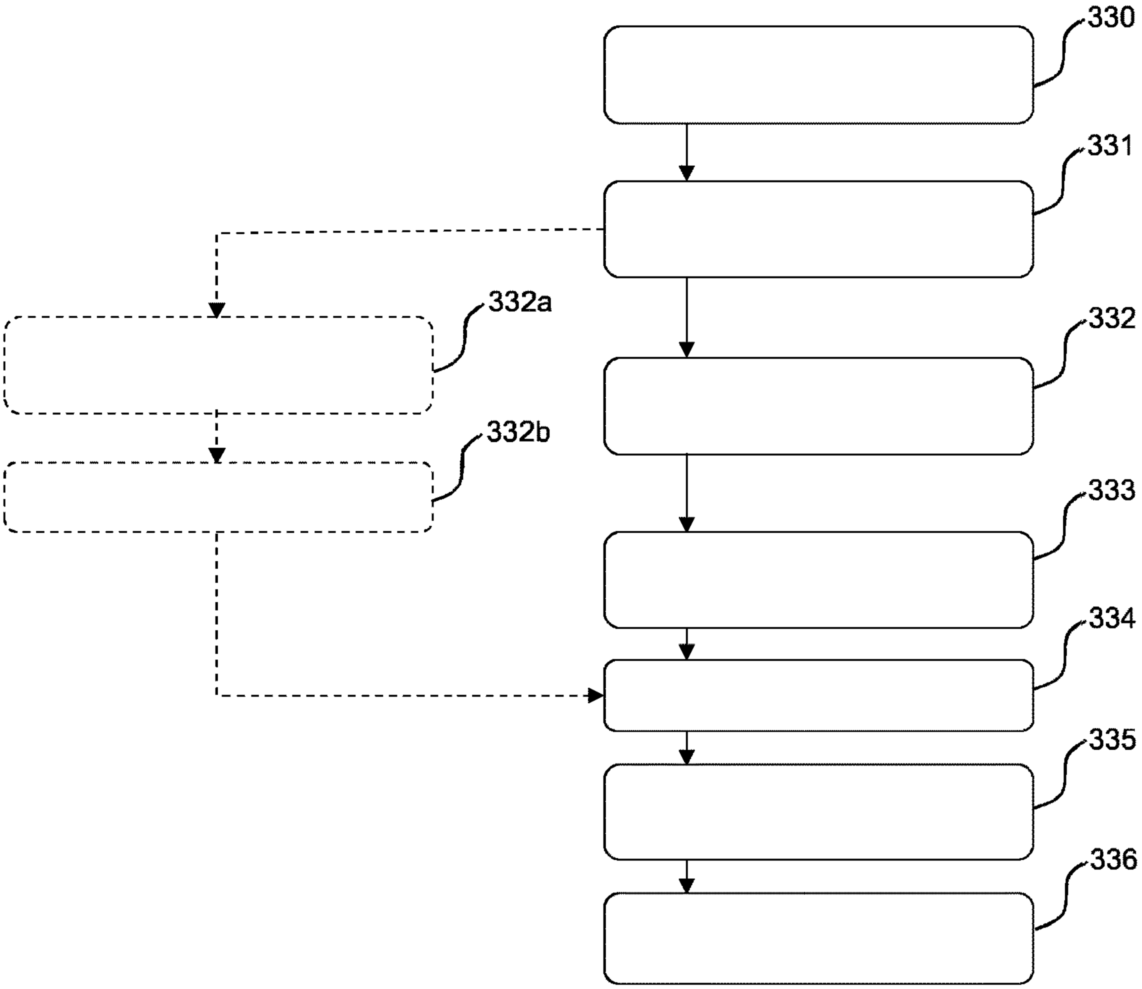

FIG. 13 schematically depicts a simplified flow chart of a method according to some embodiments. In block 330, the network element 10, for example a gNB, sends pilot signals PS (also cf. block 320 of FIG. 12) using the first antenna system 110 (FIG. 1), for example an antenna array of the first antenna system 110, using a "low" frequency band (for example with a center or central frequency of 2.4 GHz, that is a frequency band around 2.4 GHz). According to some embodiments, the pilot signals from different antenna elements of the antenna system 110 are transmitted on orthogonal radio resources.

According to some embodiments, in block 331, at least one UE, for example several or all UE, measure(s) phase differences between the pilot signals PS received from different antenna elements. According to some embodiments, phase differences between signals from different antenna elements or patches in a horizontal and/or vertical direction are evaluated.

According to some embodiments, in an optional block 332, at least one UE, for example several or all UE, determine(s), for example calculate(s), an AoD at the gNB 10 of the received pilot signals PS, wherein the AoD for example characterizes a deviation of the pilot signals from a boresight direction of the apparatus 100 of the gNB 10.

According to some embodiments, in block 333, at least one UE, for example several or all UE, feed(s) back the calculated AoD of the received pilot signals PS. According to some embodiments, the first antenna system 110 of the gNB may be used, for example the "lower" frequency range around for example 2.4 GHz.

According to some embodiments, in block 334 the gNB calculates a mean AoD to the UE(s). According to some embodiments, in block 335, the gNB 10 triggers alignment of the apparatus 100, for example to align the boresight direction BD of the apparatus 100 with the mean AoD. According to some embodiments, in block 336, a wireless information exchange may be initiated or continued for example using the second antenna system 120, with the now aligned apparatus 100.

According to some embodiments, a communication between the gNB 10 and UEs may use at least one frequency range >100 GHz or a mm-wave FR2 frequency band (for example, similar to FR2 range of 5G NR rel. 15).

According to some embodiments, beam weights of an already existing communication in for example the second frequency range FR-2 may be adapted according to the determined rotation of the array (cf. AoD), for example leading to an increased beam gain and transmission performance.

According to some embodiments, for example if using the phase differences measured by the UE(s), the gNB 10 may determine, for example calculate, a deviation of at least one, for example several or all UE(s), that is, the direction of the UE(s) from the boresight direction, also refer to block 332*b* explained in more detail further below. Then the gNB 10 may determine, for example calculate, a mean deviation of the UEs from boresight direction.

According to some embodiments, instead of performing the blocks 332, 333 of FIG. 13, the blocks 332*a*, 332*b* may be performed. In block 332*a*, at least one UE, for example several or all UE, feed(s) back a measured phase differences (cf. block 331) to the gNB, and in block 332*b* the gNB determines, for example calculates, an AoD to each of the UEs from the phase differences as obtained in block 332*a*. According to some embodiments, the first antenna system 110 of the gNB may be used for the feedback of the phase differences, for example the "lower" frequency range around for example 2.4 GHz.

According to some embodiments, the order of the blocks exemplary depicted by FIG. 13 (and by any other flow-chart disclosed herein) may be different. Also, according to some embodiments, one or more blocks may be omitted from the exemplarily depicted flow-charts.

While some embodiments have been exemplarily disclosed with reference to FIG. 13, using the first antenna system 110 of the gNB and its first frequency range FR-1, for example centered around 2.4 GHz (and corresponding antenna systems of the UE(s)), according to some embodiments, a further refinement may for example be attained by repeating at least some blocks of the procedure according to FIG. 13 using the second antenna system 120 and its second, that is higher, frequency range FR-2. In that case, according to some embodiments, the procedure of FIG. 13 may be repeated using pilot signals on antenna elements of the second antenna system 120, for example associated with a higher frequency band, which, according to some embodiments, may also be used for communication then, cf. for example block 336 of FIG. 13.

According to some embodiments, the network element 10 of FIG. 7 may be configured to perform at least some of the blocks of FIG. 13, for example blocks 330, 332*b*, 334, 336.

According to some embodiments, the user equipment 20 of FIG. 8 may be configured to perform at least some of the blocks of FIG. 13, for example blocks 331, 332, 333, 332*a*, 336.

Figure 14:
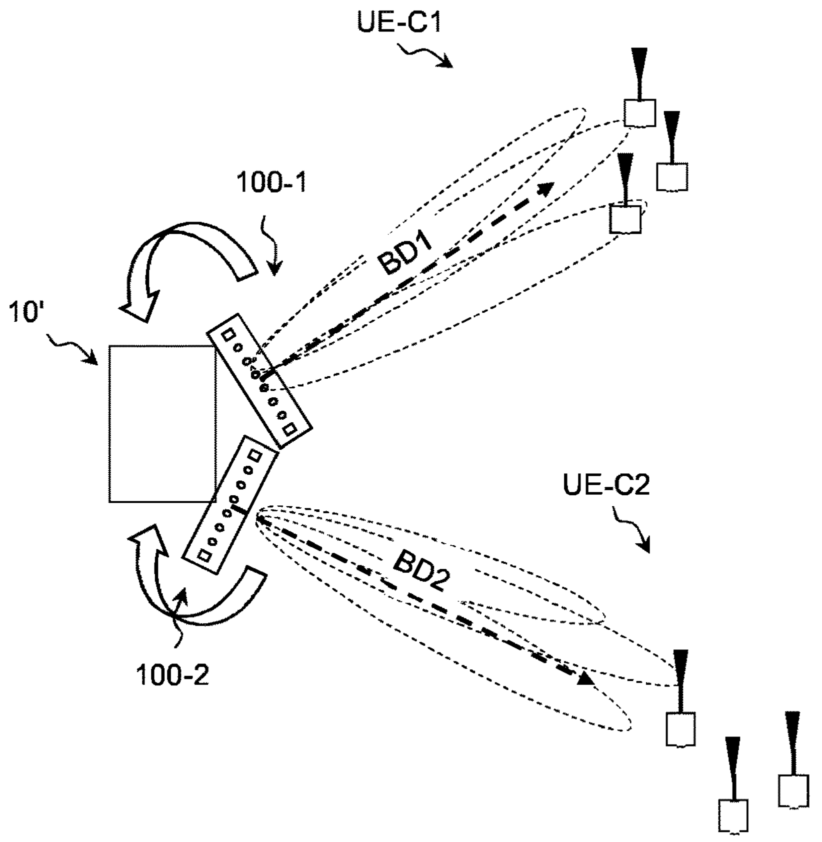

FIG. 14 schematically depicts a simplified block diagram of a scenario according to some embodiments. A gNB 10' comprises at least two apparatus 100-1, 100-2 according to the embodiments, for example at least similar to one of the configurations 100, 100*a*, 100*b*, 100*c* explained above. The gnB 10' may set a boresight direction BD1 of the apparatus 100-1 for example such that it is aligned with a first UE cluster UE-C1, and may set a boresight direction BD2 of the apparatus 100-2 for example such that it is aligned with a second UE cluster UE-C2.

According to some embodiments, the gNB 10' may generate control signals for the drive 101 (FIG. 7) to rotate the apparatus 100 to a mean direction of the UE clusters UE-C1, UE-C2, cf. for example reference sign BD3 in FIG. 11.

Figure 15:
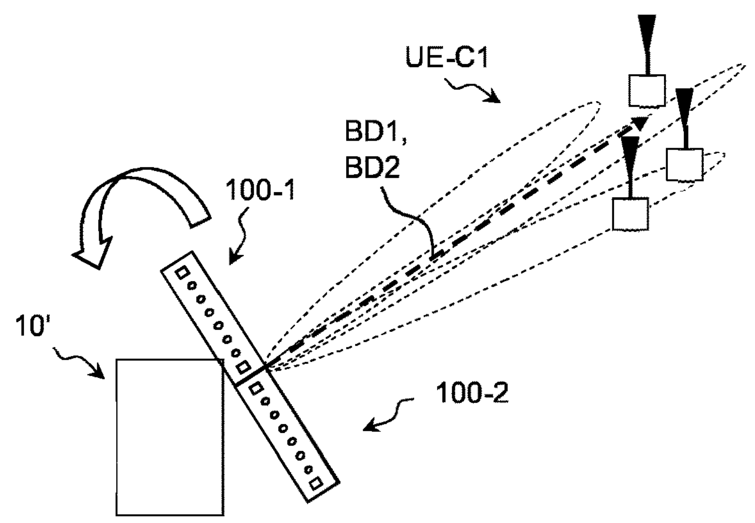

FIG. 15 schematically depicts a simplified block diagram of a scenario according to some embodiments. The gNB 10' comprises at least two apparatus 100-1, 100-2 according to the embodiments, for example at least similar to one of the configurations 100, 100*a*, 100*b*, 100*c* explained above. The gnB 10' may set the boresight direction BD1 of the apparatus 100-1 and the boresight direction BD2 of the apparatus 100-2 such that they are both aligned with the UE cluster UE-C1.

According to some embodiments, depending on the capabilities of the apparatus 100, the gNB 10' can derive a number of UE clusters and align multiple arrays towards the different UE clusters (FIG. 14) or towards one single UE cluster (FIG. 15).

According to some embodiments, the apparatus and the method according to some embodiments may be used for multiple UE clusters and/or configurations with multiple apparatus 100.

According to some embodiments, in case of multiple UE clusters, cf. for example FIG. 11, with both clusters UE-C1, UE-C2 active at the same time, with one apparatus 100, the gNB may find an optimal angle to form beams to both UE clusters UE-C1, UE-C2, for instance by trying to minimize expected interference due to a leakage to neighbour beams. Note that according to some embodiments, the expected interference may take into account a known spatial distribution of UEs.

However, according to some embodiments, multiple UE clusters may be located at a very different angle one from each other, for example in FIG. 11 they are roughly 60 degrees apart, thus making the apparatus orientation choice difficult.

In view of this, according to some embodiments, multiple apparatus 100 may be provided, wherein for example at least one apparatus is, for example mechanically, steerable, cf. the drive 101 (FIG. 7), and FIG. 14, 15. The various apparatus 100-1, 100-2 may be "split orientated" at the boresight direction BD1, BD2 of respective active UE clusters UE-C1, UE-C2.

According to some embodiments, if an access point or gNB 10' with for example two mechanically steerable apparatus 100-1, 100-2 is used to serve one active UE cluster UE-C1, cf. FIG. 15, both apparatus 100-1, 100-2 may be aligned to the same cluster UE-C1 as depicted by FIG. 15, for example achieving increased beamforming performance in terms of gain and shape, as compared to a single apparatus.

According to some embodiments, a plurality of apparatus 100 according to the embodiments may be provided, for example statically arranged with different boresight directions, for example to address different possible UE positions, for example by using one or more apparatus comprising a suitable boresight direction for the UE positions.

According to some embodiments, especially for configurations in spatially confined environments, where UE clusters may exist, some embodiments may reduce the total number of antenna elements, for example allowing to put elements in apparatus that orientate themselves (and/or under control of a gNB, for example via the drive 101) towards the target directions. This may reduce costs and may enhance performance by allowing better beam shapes and beamforming gains.

According to some embodiments, dynamic alignment of the apparatus 100 at a UE side is also possible. As an example, cf. FIG. 8, the UE 20 may also comprise at least one apparatus according to the embodiments, optionally also with at least one drive 101 to drive a movement of the at least one apparatus 100.

Insofar, according to some embodiments, the same or similar principles for example mechanical alignment during operation of the apparatus 100 of the UE 20 can be applied at the UE 20. According to some embodiments, the UE may also be assigned to (for example mounted on) a (for example, mobile) machine such as for example a robot and/or drone.

As the UE 20 may be mobile and may change its position and/or orientation dynamically within a certain range of flexibility (for example, a turning vehicle), according to some embodiments, the boresight direction of the apparatus 100 of the UE 20 may be tracked, for example by periodic angle measurements, and, according to some embodiments, the proposed alignment of the apparatus 100 can be made and/or corrected, for example in real-time.

According to some embodiments, this approach may also be used for a direct communication link (sidelink) between two UEs 20, for example moving UEs, for example respectively arranged in moving robots.

According to some embodiments, for example at high frequency bands, path loss of wireless RF communication links may be compensated with beamforming. In some embodiments, a beam width of antenna beams may be traded off to increase a beam gain. According to some embodiments, for example with mm-wave RF signals >50 GHz and sub-THz bands the path loss may be so extreme, that in some embodiments, beams can be received by UEs if the beamforming gain of these beams is high enough. In some embodiments, this may lead to comparatively narrow beams, that is having a width of about 1-5 degrees, depending on a distance and the carrier frequency. For such configurations, according to some embodiments, an efficient beams search may be made using the apparatus according to the embodiments and for example a two-stage beam search procedure based on for example repeating a process similar to FIG. 13 for comparatively large beams first (for example with the first antenna system 110), and then for smaller beams (for example with the second antenna system 120).

According to some embodiments, the beams B2-1, . . . (FIG. 6) as may for example be provided by the first antenna system 110 of the apparatus 100 enable a fast and efficient estimation of an initial beam direction.

According to some embodiments, an estimation of the rough arrival angle using the first antenna system 110 according to some embodiments allows to reduce the search space for a final (that is, more precise) beam search and alignment procedure that, according to some embodiments, may be run as a second block at the higher carrier frequencies, for example using the second antenna system 120, with more narrow and high-gain beams B2-1, B2-2, . . . , for example to determine the proper beam for transmission.

According to some embodiments, such "multiple carriers beam search operation" as enabled by some embodiments, to determine a beam for example for high frequency transmission, may, according to further embodiments, be adopted in 5G and/or next beyond 5G or 6G standards that may deal with RF signals having center frequencies >50 GHz and for example sub-THz bands.

According to some embodiments, a fast alignment of the boresight direction of the apparatus 100 may be performed at a network element 10 and/or UE 20 having at least one apparatus 100, for example based on a direction estimated for example at the first frequency range (for example, "low carrier frequency"), that is using the first antenna system 110. This may for example improve performance in case of UE clusters that have similar angular positions with respect to the network element 10, because the gain of narrow beams is maximum with steering angles close to the boresight direction of the respective array. In some embodiments, when aligning mechanically the boresight direction BD of the apparatus 100 for example to a UE cluster, the individual beams for the users within the UE cluster may have only small deviation from the boresight direction, so they may have a comparatively high gain.

According to some embodiments, the first antenna system 110 may have a first number of antenna elements, for example patches, and the second antenna system 120 may have a second number of antenna elements, for example patches, which is greater than the first number.

While according to some embodiments, the lower carrier frequency signals of the first antenna system 110 may for example be utilized primarily to determine a main beam direction, according to some embodiments, it is of course possible to transmit and/or receive (other) control information and/or data channels using the first antenna system 110 with its lower carrier frequency, for example alone or in addition to data transmissions using the second antenna system 120. This way according to some embodiments, existing multi-connectivity features as defined in communications standards such as 3GPP NR Rel. 15 may be used with the antenna systems 110, 120.

According to some embodiments, the knowledge of the main beam direction for communication between the network element 10 and a UE 20 (or a cluster of UEs) may be exploited in different advantageous ways.

According to some embodiments, with knowledge of the initial main beam direction, a high gain beam on the higher carrier frequency FR-2 can be applied directly in the measured direction, for example without a beam scan.

According to some embodiments, based on this initial beam direction, as for example determined using the wider beam B1-1 (FIG. 6), a fine tuning of the high gain beams B2-1, B2-2 (FIG. 5) on the high carrier frequency FR-2 may be applied. Due to a limited search space, for example defined by the wider beam B1-1, this may be much more efficient than scanning the whole angular space at the high carrier frequency FR-2. Instead, according to some embodiments, the scanning may be limited to a number of (here exemplarily five) narrow beams B2-1, . . . , B2-5 substantially covering the same angular range as the wider beam B1-1.

According to some embodiments, since the gain of high gain beams B2-1, B2-2, B2-3, . . . is maximum if the steering direction is close to the boresight direction of the apparatus 100, the performance may be improved if the boresight direction BD of the apparatus 100 is aligned with the direction of UE clusters, cf. for example reference signs BD1, BD2 of FIG. 11. According to some embodiments, usage of low carrier frequencies (for example, range FR-1) to estimate the direction to user clusters allows fast alignment of the apparatus 100, so that beam adjustment and fine tuning of the high gain beams B2-1, B2-2, . . . can be based on an already optimized beam direction.

According to some embodiments, an initial AoD direction may be estimated, using the first antenna system 110, that is based on the lower first frequency range FR-1.

According to some embodiments, a beam search operation may be performed, for example if sufficient low-frequency antenna elements of the first antenna system 110 are present to form sufficiently small beams.

According to some embodiments, the AoD may be estimated by transmitting pilot signals, for example from different antenna elements of the first antenna system 110 and for example allowing the UE 20 to report measurements based on the pilot signals or to directly estimate the AoD (for example, if a mapping of the antenna elements that transmitted the pilot signals is known at the UE).

According to some embodiments, the reporting of the AoD may be handled with known techniques and signaling, but is not limited to that.

According to some embodiments, a high frequency beam refinement may be set up, for example using the information about AoD estimated with the evaluation of the pilot signals as transmitted by the first antenna system 110. This way, the search space for higher frequency signal based beam search may substantially be reduced.

As an example, if AoD according to some embodiments may be estimated with a 10 degrees confidence with the first antenna system 110, the reduced search space for refinement may comprise 20 degrees, instead of for example a typical 120 degrees of a full sector space.

According to further embodiments, a beams search may comprise or cover a configured range of beam directions (for example, SSB (synchronization signal block) beams), which may for example be configured by messaging. According to further embodiments, based on the information of a low frequency range, a high frequency beam range may be reconfigured, for example to speed up the procedure. According to further embodiments, an information on an angle range may be determined based on UE measurement feedback.

According to some embodiments, reporting of the final beam, for example as obtained by refinement using the second antenna system 120, can be handled with known techniques and signaling but is not limited to that.

According to some embodiments, aspects of the above explained procedure may be configured by using signaling between the network element 10 and the UE(s) 20, which may also be standardized according to some embodiments, and/or which may at least partly rely on already standardized signaling.

According to some embodiments, a beam search configuration information may be defined related to the apparatus 100. According to some embodiments, the beam search configuration information may comprise information on the capabilities of the gNB or its apparatus 100 and/or on the UE 20 or its apparatus 100, such as for example the frequency bands or ranges FR-1, FR-2 that may be used.

According to some embodiments, a beam search configuration information may comprise information on N many (for example, N=2) frequency carriers, for example a first carrier frequency within the first frequency range FR-1, and a second carrier frequency within the second frequency range FR-2.

According to some embodiments, further signal information may be mapped to already existing signals that may for example be used for either low or high frequency beam search operations.

According to some embodiments, the drive 101 for the apparatus 100 may comprise at least one, for example two (or more), motors.

According to some embodiments, the drive 101 may also comprise actuators for example based on meta materials which can for example change their mechanical dimensions by applying appropriate control voltages.

As an example, if an array of the apparatus 100 or the apparatus 100 is mounted on such material, according to some embodiments, the control voltages for example derived from the measurement procedure (evaluation of the pilot signals PS) may be used to modify the mount of the apparatus, for example to align the boresight direction BD of the apparatus 100 to the UE cluster(s). An example for such materials, which may be used according to some embodiments, is described in the patent publication EP 2 916 385 A1.

As an example, meanwhile, materials are available which can change their physical dimensions by about 50% when applying appropriate control voltage, which may be used for the drive 101 according to some embodiments.

Some embodiments may at least temporarily enable a fast and efficient beam selection and may also at least to some degree address the problem of system performance degradation due to beam gain reduction and beam shape variation at large steering angles relative to the boresight direction.

Even though some embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiments. It will be obvious to a person skilled in the art that, as technology advances, the concept according to the embodiments can be implemented in various ways. Further, it is clear to a person skilled in the art that the described embodiments may, but are not required to, be combined with other embodiments in various ways.

The invention claimed is:

1. A first apparatus for a wireless communications system comprising at least one further apparatus for processing radio frequency signals, the at least one further apparatus comprising a first antenna system having a controllable first antenna characteristic and a second antenna system having a controllable second antenna characteristic, wherein the first antenna system is configured to operate in a first frequency range and the second antenna system is configured to operate in a second frequency range which is different from the first frequency range, and wherein the first apparatus is configured to:

perform a first beam search using the first antenna system to determine an estimate value of at least one of an angle of arrival or an angle of departure of radio frequency signals;

set a boresight direction of the at least one further apparatus based on the estimate value by rotating the at least one further apparatus; and perform a second beam search using the second antenna system based on the estimate value.

2. The first apparatus according to claim 1, further comprising a carrier, wherein the first antenna system and the second antenna system is arranged on the carrier.

3. The first apparatus according to claim 2, wherein the first antenna system comprises a plurality of antenna elements, wherein at least one of the plurality of antenna elements is arranged in a radially outer region of the carrier.

4. The first apparatus according to claim 2, wherein the second antenna system comprises at least a first antenna element, wherein the first antenna element of the second antenna system is arranged in a radially inner region of the carrier.

5. The first apparatus according to claim 2, wherein the second antenna system comprises at least a first antenna element and a second antenna element, wherein the second antenna element of the second antenna system is arranged in a radially outer region of the carrier.

6. The first apparatus according to claim 1, wherein at least one of the first antenna system and the second antenna system comprises at least one of: a) antenna array, b) a plurality of patches.

7. The first apparatus according to claim 1, wherein the first frequency range comprises frequencies less than or equal to 6 GHz, for example between 450 MHz and 6 GHz.

8. The first apparatus according to claim 1, wherein the second frequency range comprises frequencies greater than 6 GHz.

9. The first apparatus according to claim 1, wherein the first apparatus is configured to send pilot signals using the first antenna system, and to receive, from a second apparatus, at least one of: a) first information characterizing an angle of departure of the pilot signals at the first apparatus or b) a second information characterizing a phase difference between the pilot signals as determined by the second apparatus.

10. The first apparatus according to claim 9, wherein the first apparatus is configured to align a boresight direction of the apparatus based on at least one of the first information and the second information.

11. The first apparatus according to claim 1, wherein the at least one further apparatus comprises a first further apparatus and a second further apparatus, wherein the first apparatus is configured to align a first boresight direction of the first further apparatus and a second boresight direction of the second further apparatus, wherein the second boresight direction of the second further apparatus is different from the first boresight direction of the first further apparatus.

12. A second apparatus configured to wirelessly exchange information with the first apparatus according to claim 1, via the first antenna system or the second antenna system, wherein the second apparatus is also configured to:

receive pilot signals sent by the first apparatus using the first antenna system; and determine an angle of departure at the first apparatus of the received pilot signals, wherein the angle of departure characterizes a deviation of the pilot signals from a boresight direction of the at least one further apparatus of the first apparatus.

13. The second apparatus according to claim 12, wherein the second apparatus is configured to send a first information characterizing an angle of departure, AoD, of the pilot signals at the first apparatus to the first apparatus.

14. The second apparatus according to claim 12, wherein the second apparatus is configured to send a second information characterizing a phase difference between the pilot signals as determined by the second apparatus to the first apparatus.

15. The second apparatus according to claim 12, wherein the second apparatus is further configured to perform:

measuring phase differences between the pilot signals received from different antenna elements, by evaluating phase differences between signals from different antenna elements or patches in a horizontal and/or vertical direction.

16. The second apparatus according to claim 15, wherein the second apparatus is configured to feed back measured phase differences to the first apparatus.

17. The second apparatus according to claim 12, wherein the second apparatus is a user equipment.

18. The first apparatus according to claim 1, wherein the first antenna system is configured to utilize a first set of beams and the second antenna system is configured to utilize a second set of beams, and wherein the first set of beams is wider than the second set of beams.

19. The first apparatus according to claim 18, wherein the network element is configured to:

perform a second beam search using the second antenna system, wherein the second beam search is limited to a number of the set of beams that covers a same angular range as the set of beams with which the first antenna system is configured to operate.

20. The first apparatus according to claim 1, wherein the first apparatus is a network element.

* * * * *